US006983972B2

(12) United States Patent  
Tan et al.

(10) Patent No.: US 6,983,972 B2
(45) Date of Patent: Jan. 10, 2006

(54) VEHICLE TAILGATE WITH SUPPLEMENTAL TAILGATE HAVING LATCHING MECHANISM

(75) Inventors: Kian-Huat Tan, Westland, MI (US); Herbert Gruber, Rochester Hills, MI (US)

(73) Assignees: Ford Global Technologies LLC, Dearborn, MI (US); Multimatic Inc., Markham, NY (US)

( * ) Notice: Subject to any disclaimer, the term of this patent is extended or adjusted under 35 U.S.C. 154(b) by 0 days.

(21) Appl. No.: 10/970,167

(22) Filed: Oct. 21, 2004

(65) Prior Publication Data

US 2005/0110293 A1 May 26, 2005

Related U.S. Application Data

(60) Provisional application No. 60/515,521, filed on Oct. 29, 2003, provisional application No. 60/515,370, filed on Oct. 29, 2003.

(51) Int. Cl.
*B62D 33/03* (2006.01)

(52) U.S. Cl. .................................. 296/57.1; 296/26.09
(58) Field of Classification Search ............... 296/57.1, 296/26.08, 26.09, 26.1, 26.11; 224/402, 224/403, 405
See application file for complete search history.

(56) References Cited

U.S. PATENT DOCUMENTS

| 4,624,619 | A | 11/1986 | Uher |
| 5,312,149 | A | 5/1994 | Boone |
| 5,468,038 | A | 11/1995 | Sauri |
| 5,478,130 | A | 12/1995 | Matulin et al. |
| 5,700,047 | A | 12/1997 | Leitner et al. |
| 5,788,311 | A | 8/1998 | Tibbals |
| 5,806,907 | A | 9/1998 | Martinus et al. |
| 5,902,000 | A | 5/1999 | Wold |
| 5,988,725 | A | 11/1999 | Cole |
| 6,019,410 | A | 2/2000 | Trostle et al. |
| 6,045,172 | A | 4/2000 | Thomas et al. |
| 6,120,076 | A | 9/2000 | Adsit et al. |
| 6,364,392 | B1 * | 4/2002 | Meinke ........................ 296/62 |
| 6,425,618 | B1 | 7/2002 | Garland et al. |
| 6,454,338 | B1 | 9/2002 | Glickman et al. |
| 6,626,478 | B1 | 9/2003 | Minton |
| 6,676,182 | B2 | 1/2004 | Fitts |
| 2004/0227368 | A1 * | 11/2004 | Seksaria et al. ........... 296/26.1 |

FOREIGN PATENT DOCUMENTS

DE 2745751 4/1979

\* cited by examiner

*Primary Examiner*—Joseph D. Pape
(74) *Attorney, Agent, or Firm*—Gigette M. Bejin; Miller Law Group PLLC (57) ABSTRACT

A tailgate for a vehicle has a supplemental tailgate that retracts within the tailgate and is extendable therefrom in order to provide multiple assist functions. The supplemental tailgate includes a generally fixed guide portion and a movable frame assembly. The movable frame assembly includes a pivotable molding, which mounts on a cross member, and a latching assembly that mounts generally within telescoping supports, which selectively slide within the guide portion. When pivoted, the pivotable molding releases the latching assembly, allowing the movable portion of the supplemental tailgate to be moved to various extended positions. When the supplemental tailgate is in its stowed position, the pivotable molding is aligned with the top surface of the tailgate in order to provide an esthetically pleasing appearance and provide paint scratch resistance. When the movable frame portion is in an essentially fully extended position, it can be rotated relative to the tailgate in order to provide certain of the assist functions.

26 Claims, 10 Drawing Sheets

VEHICLE TAILGATE WITH SUPPLEMENTAL TAILGATE HAVING LATCHING MECHANISM

CROSS REFERENCE TO RELATED APPLICATIONS

This application claims the benefit of U.S. provisional patent applications identified as Application No. 60/515,521, filed Oct. 29, 2003, and Application No. 60/515,370, filed Oct. 29, 2003, and are both incorporated herein by reference.

BACKGROUND OF INVENTION

The present invention relates to vehicle tailgates, and more particularly to vehicle tailgates that include a multi-function assembly extendable therefrom.

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is desirable to have an extender that can provide other functions in addition to a bed extender, such as a box extender (an upwardly extending structure from an open tailgate that mimics the function of a closed tailgate), an assist step (a downwardly extending structure from an open tailgate that can be stepped-on for assistance in entering the bed), or even a roof rack type of function (an upwardly extending structure from a closed tailgate that works in conjunction with the vehicle roof to support long loads). Preferably, such functions can be provided with simple ergonomic operation of the assembly, while still allowing for an attractive appearance for the vehicle when the extender is stowed during periods of non-use. However, while the exterior mounted extenders may be able to perform multiple functions, they still suffer from the drawbacks of an unattractive appearance and taking up room in the bed even when not in use.

A drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Thus, it is desirable to have a vehicle tailgate with an extender that overcomes the drawbacks of the prior art.

SUMMARY OF INVENTION

In its embodiments, the present invention contemplates a tailgate assembly for use with a motor vehicle having a pair of spaced, generally vertical side walls and a generally horizontal bed extending therebetween. The tailgate assembly may include a tailgate frame defining a generally hollow cavity and adapted to pivotally mount generally between the side walls and being operable in a generally horizontal open position and a generally vertical closed position. The tailgate assembly also may include a supplemental tailgate including a first and a second guide tube secured generally within the hollow cavity, and with the first guide tube including a latch device; and a movable frame assembly having a first and a second telescoping support, with the first telescoping support telescopically extendable from and retained by the first guide tube and the second telescoping support telescopically extendable from and retained by the second guide tube, a cross member connected to the first and second telescoping supports and extending therebetween, a release lever mounted on the cross member, and a latching assembly mounted within the first telescoping support and operatively connected to the release lever and to the latch device.

An embodiment of the present invention also contemplates a supplemental tailgate assembly for use with a vehicle tailgate having a tailgate frame defining a generally hollow cavity therein. The supplemental tailgate assembly may have a guide system including at least one guide tube secured generally within the hollow cavity and including a latch device; and a movable frame assembly having at least one telescoping support, with the at least one telescoping support telescopically extendable from and retained by the at least one tube, a cross member connected to the at least one telescoping support and extending generally normal thereto, a release lever mounted on the cross member, and a latching assembly mounted within the at least one telescoping support and operatively connected to the release lever and to the latch device.

An advantage of an embodiment of the present invention is that the supplemental tailgate is simple to operate, thus making it easy to extend the supplemental tailgate and move it into the desired operating position, as well as retract the supplemental tailgate back into its stowed position. Moreover, the supplemental tailgate can be easily and quickly locked into one of a number of partially extended positions, as is desired for the particular application. And, as the supplemental tailgate is being extended and retracted, it will slide smoothly with minimal chance of binding, thus providing a desirable function and feel for the operator.

Another advantage of an embodiment of the present invention is that the supplemental tailgate, when in its retracted position during times of nonuse and when using a pivotable molding type handle, will not detract from the attractiveness of the vehicle. Moreover, it can closely match the look of tailgates for similar trucks that do not have a supplemental tailgate, thus allowing for essentially the same appearance across that particular line of trucks.

A further advantage of an embodiment of the present invention is that the supplemental tailgate handle is easy to reach and operate, no matter what positions the tailgate and supplemental tailgate are in. Moreover, the supplemental tailgate handle is spaced from the conventional tailgate release handle, avoiding unnecessary complications in the tailgate release handle and mechanism, while allowing both to be ergonomically located for ease of operation.

An additional advantage of an embodiment of the present invention is that the highly ergonomic and esthetically pleasing supplemental tailgate assembly still allows for a robust and compact multi-function bed extender. This supplemental tailgate assembly can be moved to different positions in order to be employed to extend the bed, extend the box, function as an assist step, and function as a supplemental roof rack.

DETAILED DESCRIPTION

FIGS. 1–13 illustrate a tailgate 20 that mounts to a vehicle 24 preferably a pickup truck. The tailgate 20 includes a supplemental tailgate 22 mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

Figure 1:
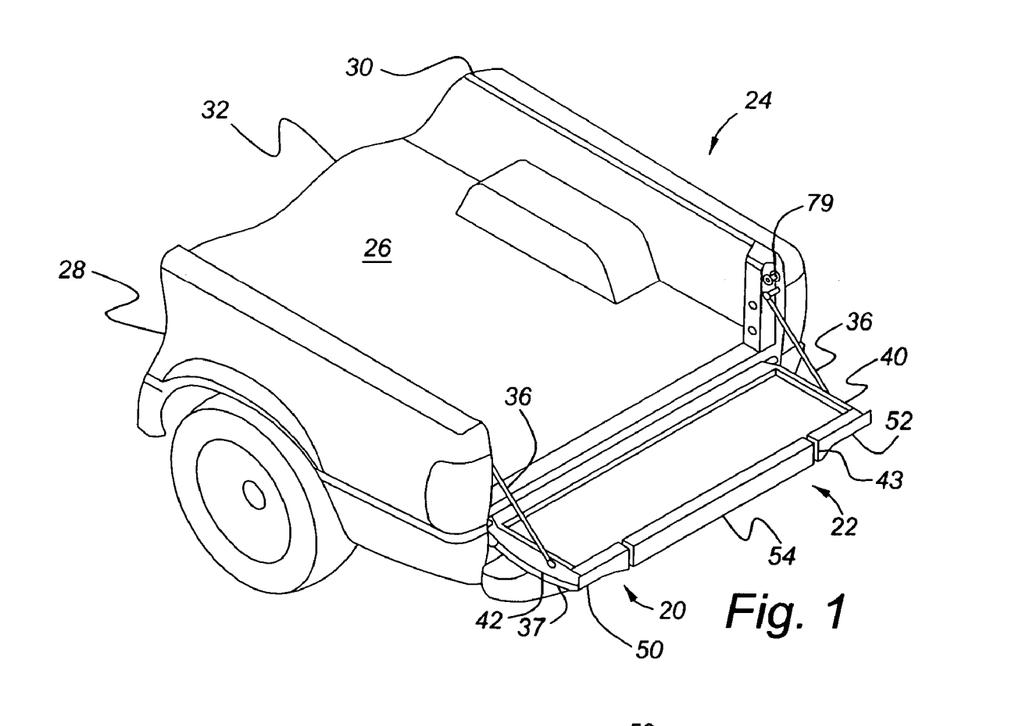
FIG. 1 is a rear perspective view of a vehicle incorporating a tailgate, with the tailgate shown in a generally horizontal open position, in accordance with the present invention.
Figure 4:
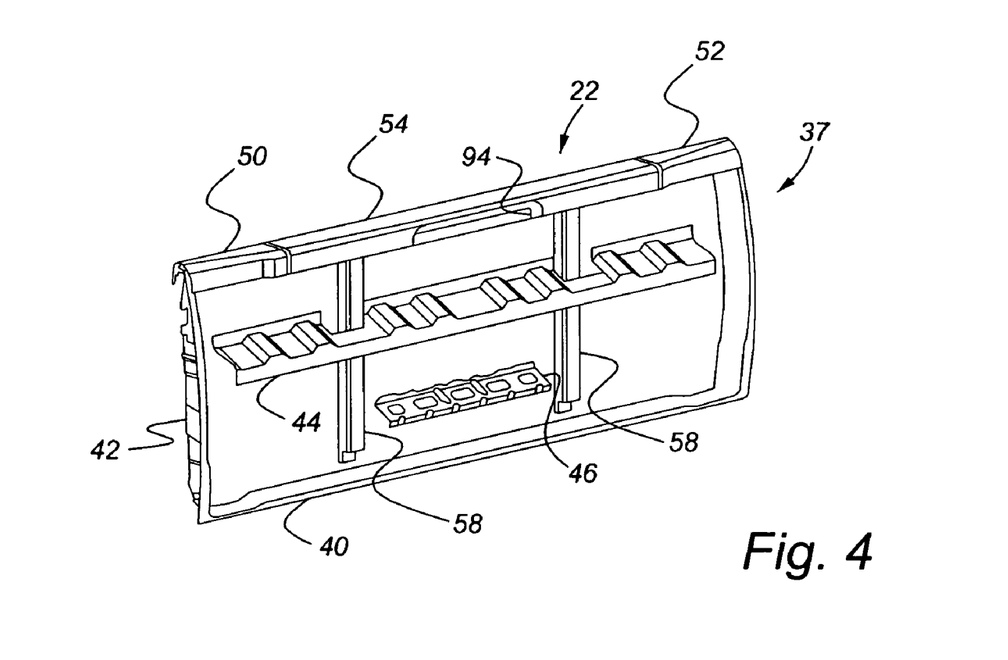
FIG. 4 is a rear perspective view of the tailgate, but with the tailgate frame outer panel not shown, in accordance with the present invention.
Figures 5, 6:
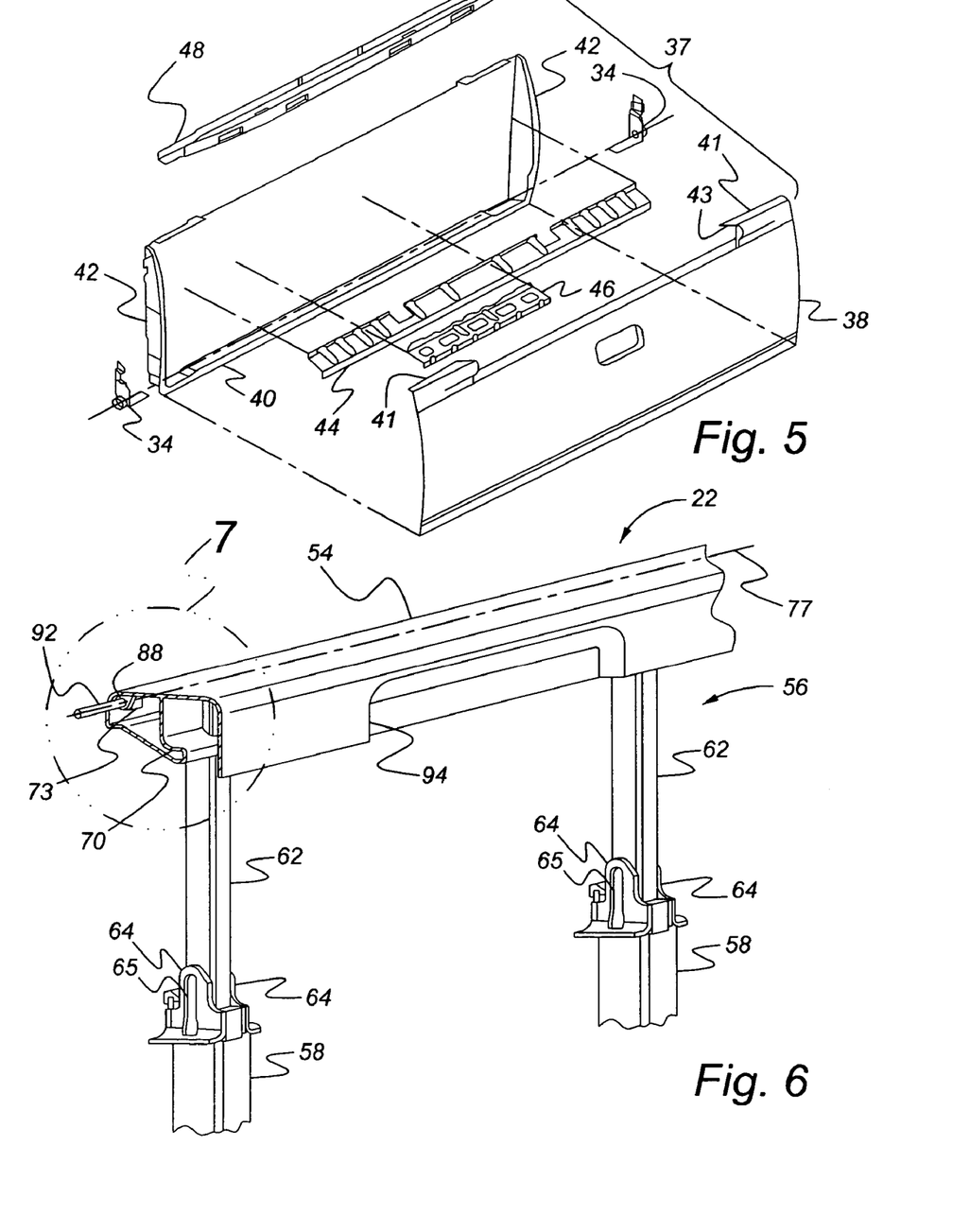
FIG. 5 is a rear exploded perspective view of the tailgate frame, without side moldings shown, in accordance with the present invention.
FIG. 6 is a rear perspective, partially sectioned view of the supplemental tailgate in accordance with the present invention.

The tailgate 20 includes a pair of conventional tailgate hinges 34 that preferably cooperate with the side panels 28, 30, and a pair of tailgate supports 36, which support the tailgate 20 when in its horizontal position. A tailgate handle 35 mounts to an outer panel 38, and functions in a conventional manner. The tailgate release mechanism connected to the handle 35, as well as tailgate latches, are conventional and well known in the art and so are not shown herein for clarity in describing the present invention. The tailgate 20 is comprised of a tailgate frame 37 including the outer panel 38, which forms the outer finished surface of the tailgate 20, and a tailgate frame inner panel 40, which mounts to the outer panel 38 and forms the inner surface and sides 42 of the tailgate 20. The outer panel 38 and inner panel 40 combine to form a pair of upper surfaces 41 with a gap 43 therebetween. A tailgate reinforcement strainer 44, tailgate reinforcement panel 46, and tailgate reinforcement channel 48 mount and provide structural support to the frame outer and inner panels 38, 40. Preferably, a left tailgate molding 50 and a right tailgate molding 52 mount on top of the upper surfaces 41. They may be made of colored plastic that is the desired color of the parts; this eliminates the need to paint them. In this way, the tailgate moldings 50, 52 will help to prevent paint scratches on metal parts when cargo is being loaded over the top of a closed tailgate 20.

The components that make up the tailgate frame 37 are formed so that a hollow internal cavity is created. Within this cavity, the supplemental tailgate 22 is retained. The supplemental tailgate 22 includes a handle 54, a movable frame portion 56, and guide rails 58. The handle 54 shown is a pivotable molding 54. However, a variety of handles may be used with the supplemental tailgate 22. The guide rails 58 are hollow, and may be generally rectangular tubes that are fixed to the tailgate frame 37 and support the movable frame portion 56 as it is telescopically extended from and retracted into the guide rails 58.

Each guide rail 58 includes pivot brackets 64 securely mounted on top that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the reinforcement channel 48, and the bottoms of the guide rails 58 may be fastened to the inner panel 40, in order to help secure the guide rails 58 to the tailgate 20.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or some other suitable means. Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position.

Figure 8:
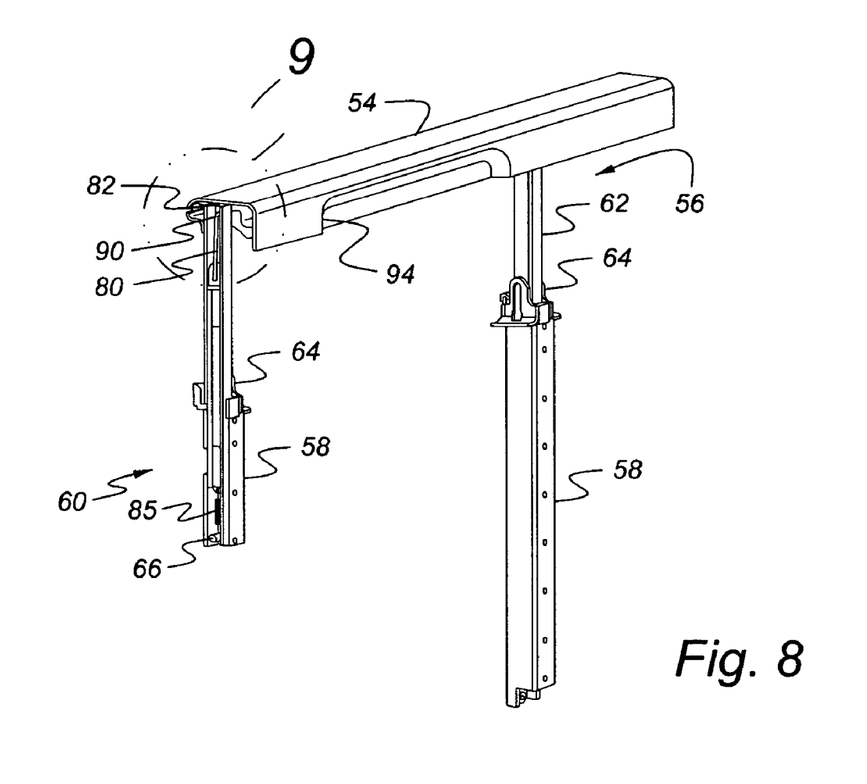
FIG. 8 is a rear perspective, partially sectioned view similar to FIG. 6, but with the section cut taken at a different location.

Each of the movable frame portion's support tubes 62 are hollow so they can receive a respective one of the two latching assemblies 60 therein. More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which may be affixed to the pivotable molding 54, in order to form a release hinge 84.

Even though, for some features of the supplemental tailgate 22, only the feature on the left or right side is shown, the supplemental tailgate 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The lower ends of the latch housings 78 connect to latch return springs 85, which, in turn, are connected to the hinge pins 66. Also connected to the hinge pins 66 are linear guides 89. The linear guides 89 include sliders 91, which provide for surface contact with the inside of the guide rails 58.

Figure 7:
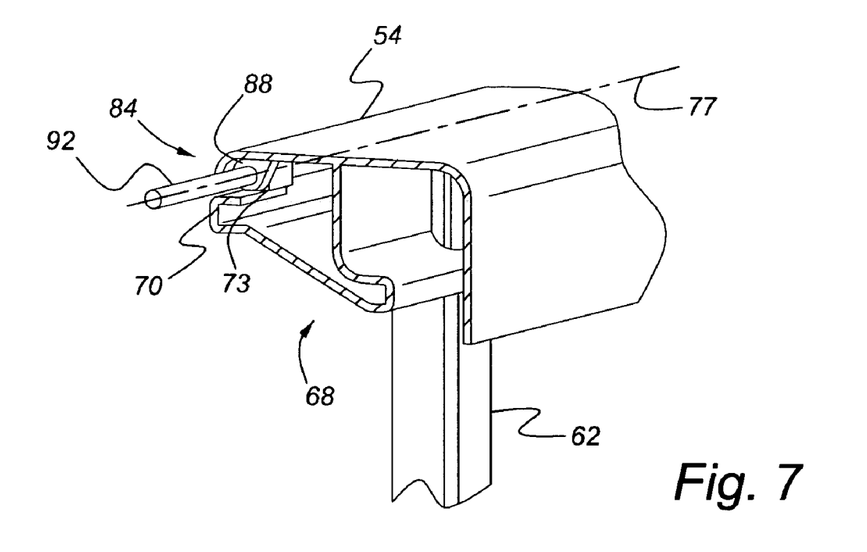
FIG. 7 is a view, on an enlarged scale, illustrating encircled area 7 in FIG. 6.
Figure 9:
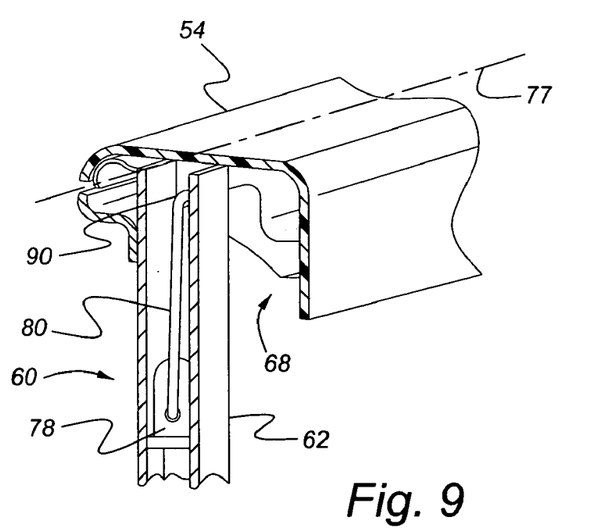
FIG. 9 is a view, on an enlarged scale, illustrating encircled area 9 in FIG. 8.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the supplemental tailgate 22 is in its stowed position. Each latch housing 78 also includes internal flanges 99, located within the slot 93, that engage with release ramps 100 on the latch blade 87.

Figures 10, 11:
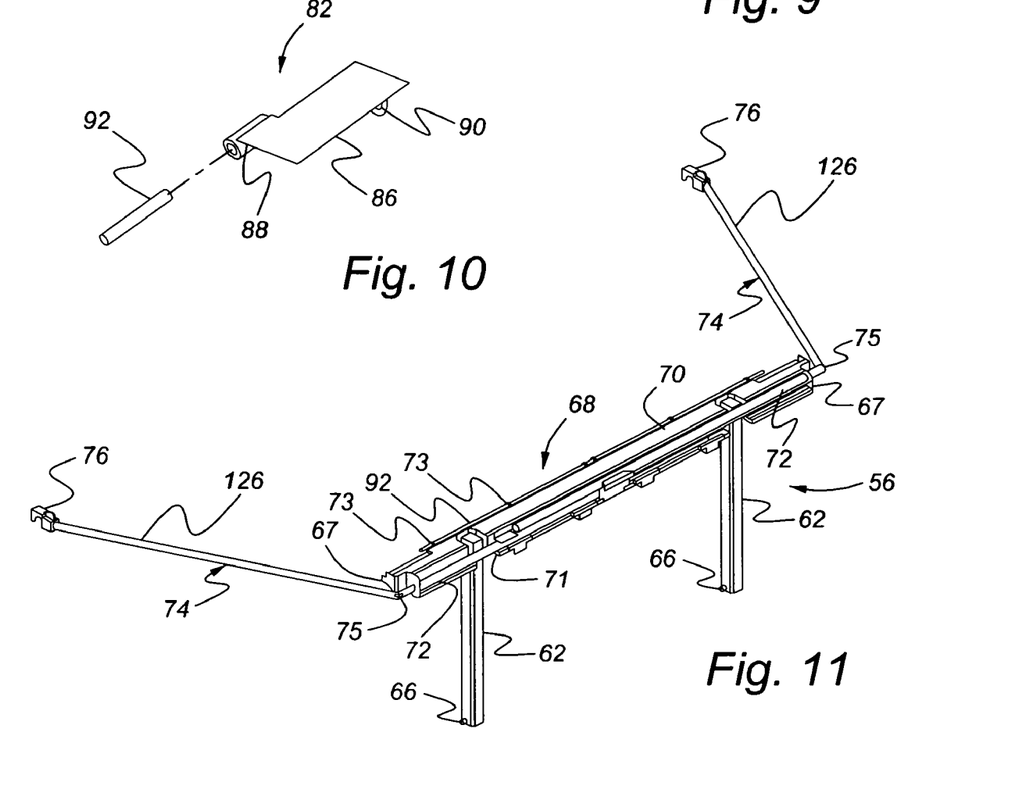
FIG. 10 is a perspective view of a release lever in accordance with the present invention.
FIG. 11 is a rear perspective view of a movable frame portion of the supplemental tailgate, but without the guide brackets illustrated, in accordance with the present invention.
Figure 12:
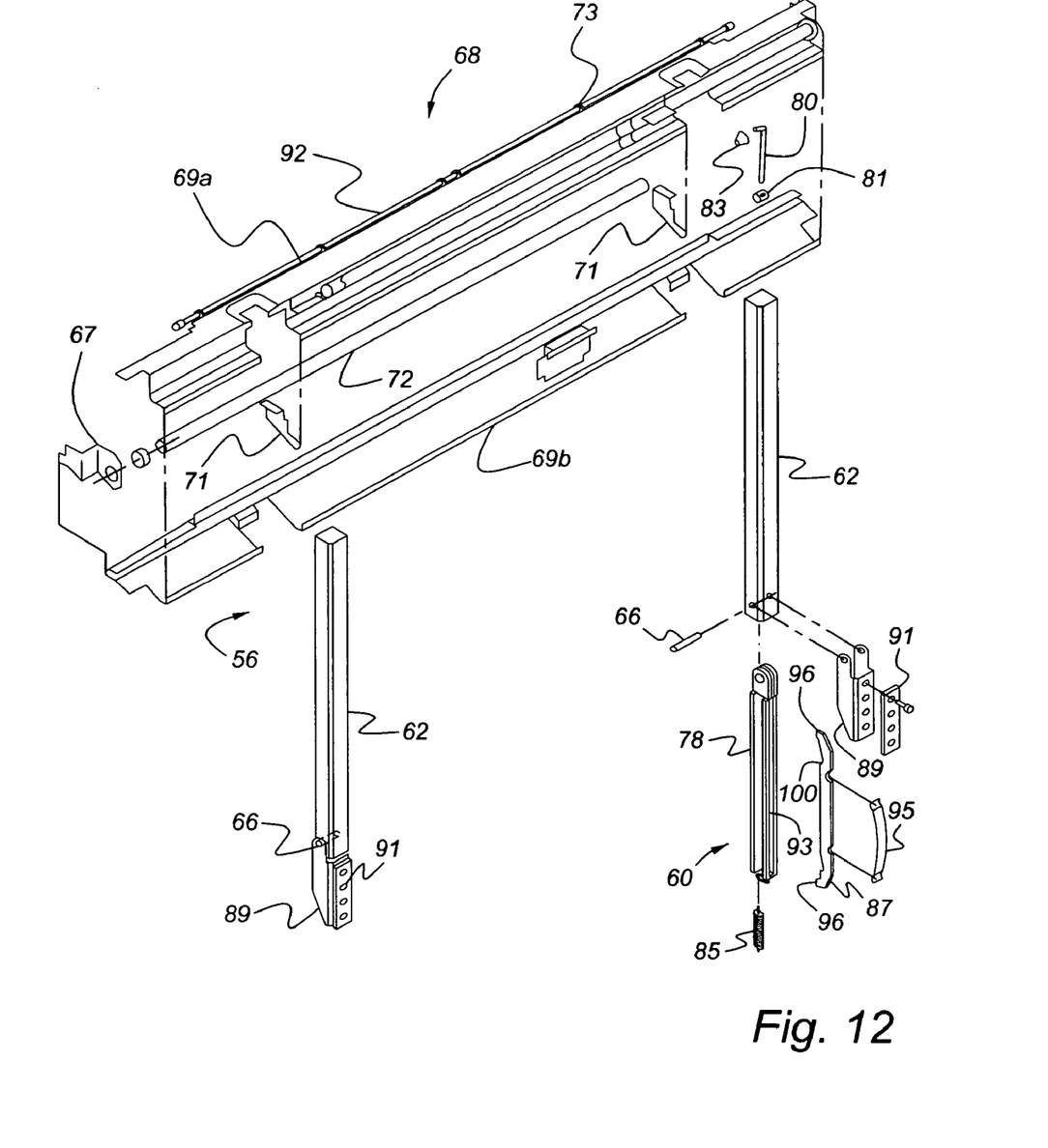
FIG. 12 is a rear perspective view of the movable frame portion, similar to FIG. 11, but without the lock rod assemblies illustrated.
Figure 13:
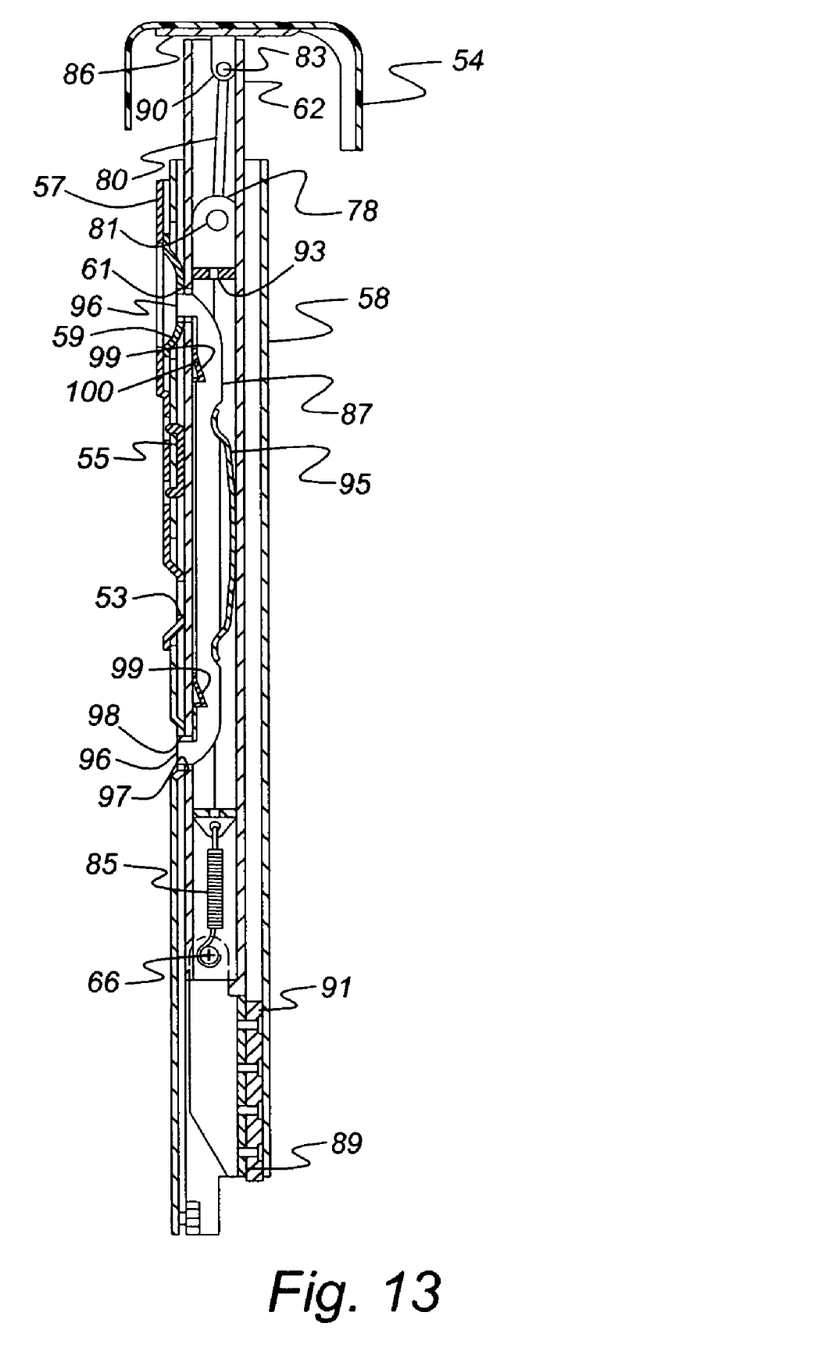
FIG. 13 is a side sectional view of the supplemental tailgate in accordance with the present invention.
Figure 14:
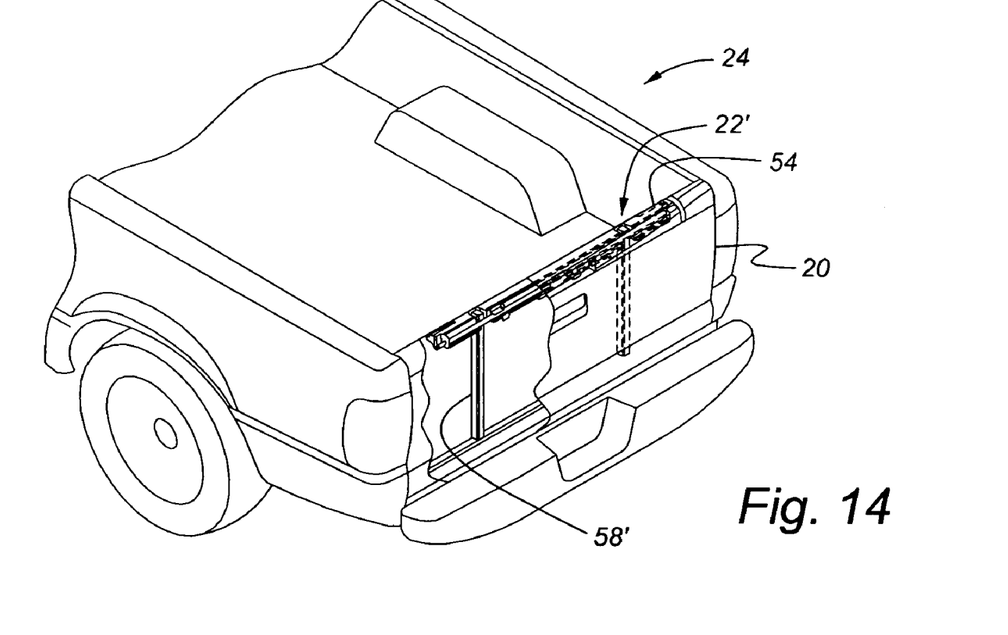
FIG. 14 is a partial cutaway, perspective view similar to FIG. 1, but illustrating the supplemental tailgate retracted into the closed tailgate according to a second embodiment of the present invention.
Figure 15:
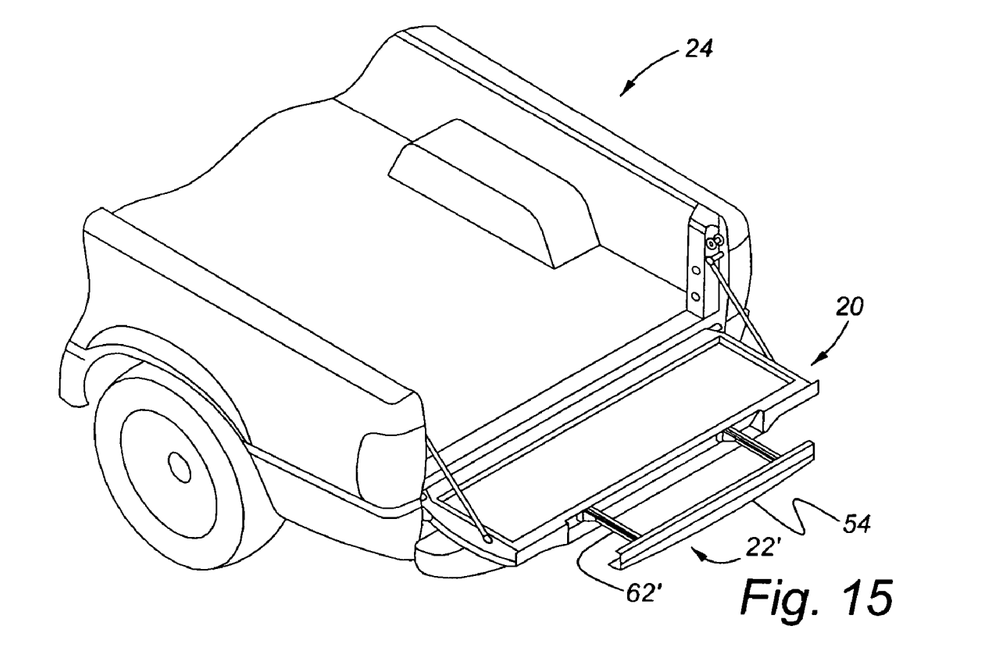
FIG. 15 is a perspective view illustrating the second embodiment of FIG. 14, but with the tailgate open and the supplemental tailgate in a partially extended position.

The movable frame portion 56 also includes a cross member assembly 68 that connects to the tops of the support tubes 62. The cross member assembly 68 may also include a pair of cross members 69a and 69b, post brackets 71 and lock rod brackets 67 that form a support frame 70. The cross member assembly 68 also includes a pair of hollow tubes 72 and six pivot mounts 73 mounted on the support frame 70.

The support frame 70 may be formed strong enough to support the weight of one or more people standing on it. This way, when the movable frame portion 56 is extended out and pivoted downward toward the ground, the support frame 70 can be used as a step.

The hollow tubes 72 may each telescopically receive a respective one of two lock rod assemblies 74, which each have pivot hinges 75 at one end of a rod 126 and lock rod latches 76 at the far ends. The pivot hinges 75 allow the lock rod assemblies 74 to be extended toward the truck so that the lock rod latches 76 can hook to supports 79 on the truck box 26 in order to allow the movable frame portion 56 to be held in its upright position, thus creating a box extender.

Where the handle is a pivotable molding 54, the pivot mounts 73 connect to and mount the pivotable molding 54 about a pivot axis 77. More specifically, the pivotable molding 54 may be formed from plastic, or other suitable material, such as, for example, a thirty percent glass filled polypropylene. The release levers 82 may be molded into the pivotable molding 54 while it is being formed or affixed thereto after forming by, for example, friction welding. Each release lever 82 includes a base 86 that is adjacent to the pivotable molding 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latching assemblies 60 unlatch, allowing the support tubes 62 to slide relative to the guide rails 58, when the latch actuation rods 80 are pulled upwards, and re-engage when the latch actuation rods 80 are released.

Figure 2:
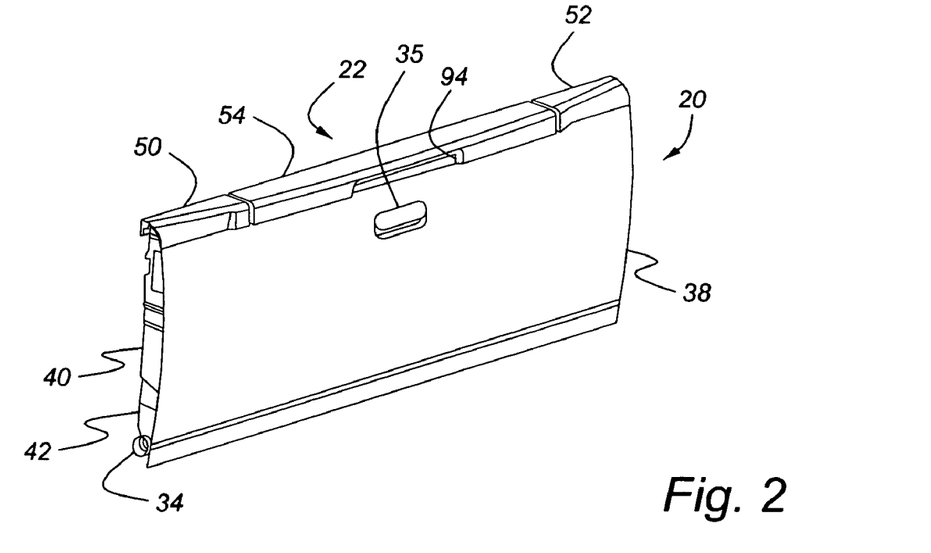
FIG. 2 is a rear perspective view of the tailgate as it would be oriented in a generally vertical closed position on a vehicle, and with the pivotable molding in its latch engaged position, in accordance with the present invention.
Figure 3:
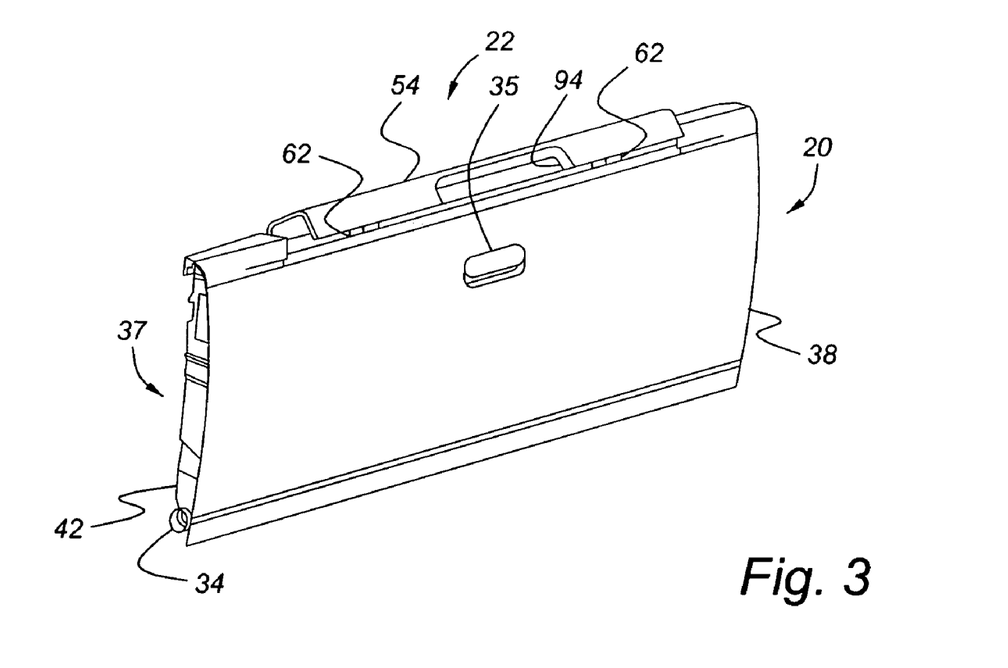
FIG. 3 is a rear perspective view similar to FIG. 2, but with the pivotable molding in its latch disengaged position.

The pivotable molding 54 may be molded with the plastic being the desired final color so that it does not have to be painted. The pivotable molding 54 may also include a handle pocket 94 that is molded into the rear surface of the pivotable molding 54. The handle pocket 94 provides for ease of gripping and pivoting the pivotable molding 54 when deploying the supplemental tailgate 22. The pivotable molding 54 may also have an overall width that is just smaller than the gap 43 formed between the two tailgate moldings 50, 52, and has a top surface that is flush with the top surfaces of the two tailgate moldings 50, 52. Additionally, if so desired, the two tailgate moldings 50, 52 may include recessed flanges (not shown) that nest under the edges of the pivotable molding 54. Accordingly, the supplemental tailgate 22, when using a pivotable molding type handle and when in its fully retracted position, will blend-in with the tailgate 20, having an appearance that is very similar to a tailgate that does not include a supplemental tailgate. Thus, the supplemental tailgate 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns.

The operation of the supplemental tailgate 22 will now be described. The supplemental tailgate 22 may be easily released from its stowed position within the tailgate 20 while the tailgate 20 is in its open or closed position. Although, for the most advantageous use of the supplemental tailgate functions, the tailgate 20 will be in its horizontal open position. One may, if so desired, employ an extra latching mechanism (not shown) that may only allow release of the supplemental tailgate 22 when the tailgate is in its horizontal position.

To deploy the supplemental tailgate 20 from its stowed position, one grasps the pivotable molding 54 and pivots it relative to the pivot axis 77. This will cause the release flanges 90 to pull up on the latch actuation rods 80, which, in turn, will pull up on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

One then pulls on the supplemental tailgate 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at these extended positions, the support tubes 62 still remain partially within the guide rails 58 so that the two will not pivot relative to one another. With the tailgate 20 in its horizontal open position, the supplemental tailgate 22 is now in its bed extender position. While only a limited number of bed extender positions are discussed herein, the supplemental tailgate 22 may have additional bed extender positions by providing additional engagement slots, if so desired.

The pivotable molding 54 may then be pivoted again to release the latching assemblies 60 once more. One may then pull the supplemental tailgate 22 out to its fully extended position relative to the open tailgate 20. In this fully extended position, the support tubes 62 will be pulled out of the guide rails 58, with the hinge pins 66 engaged in the slots 65 of the pivot brackets 64.

The movable frame portion 56, from its fully extended position, can be pivoted into a downward extending vertical position to serve as a step, with the support frame 70 acting as the step. In this downward position, the pivotable molding 54 is on the underside of the movable frame portion 56, so it will not be stepped-on and damaged by the operator. Also, the support tubes 62 may be short enough that the pivotable molding 54 is spaced above the ground upon which the vehicle is standing. In this way, the molding 54 will not be scraped or damaged by contact with the ground, and the support frame 70, being higher off of the ground, will provide a better assist step function.

The movable frame portion 56, from its fully extended position, can also be pivoted upward into an upward extending vertical position, to serve as a box extender. The lock rod assemblies 74 are deployed and latched onto the hook supports 79 on the box 26 in order to hold the movable frame portion 56 in the upright position. The hook supports 79 may be just the existing pin strikers that are normally used to hold the tailgate 20 in its closed position. In this way, the vehicle 24 is essentially the same, with the only difference being whether a conventional tailgate or the tailgate 20 of the present invention is mounted on the vehicle 24.

Additionally, when the tailgate 20 is closed and the movable frame portion 56 is in its partially extended position, the supplemental tailgate 22 can serve a supplemental roof rack function. The top of the pivotable molding 54 will work in conjunction with the roof of the cab (not shown) in order to provide support for very long objets, such as ladders, canoes, etc.

Performing the deployment operation generally in reverse will allow one to easily stow and latch the supplemental tailgate 22 back into the tailgate 20. Hence, a robust, easy to operate and ergonomic supplemental tailgate 22 is provided for the vehicle 24.

While the latching assemblies 60 are shown connected to and actuated by the pivotable molding 54, they may be connected to and actuated by a more conventional handle instead, if so desired.

FIGS. 14–19 illustrate a second embodiment of the present invention. This embodiment is similar to the first embodiment, except that the guide rails 58', support tubes 62', and latching assemblies 60' of the supplemental tailgate 22' are modified. The guide rails 58' are still mounted within the tailgate 20 of the vehicle 24, preferably with the pivotable molding 54 still employed for releasing the latching assemblies 60'.

Figures 16, 17:
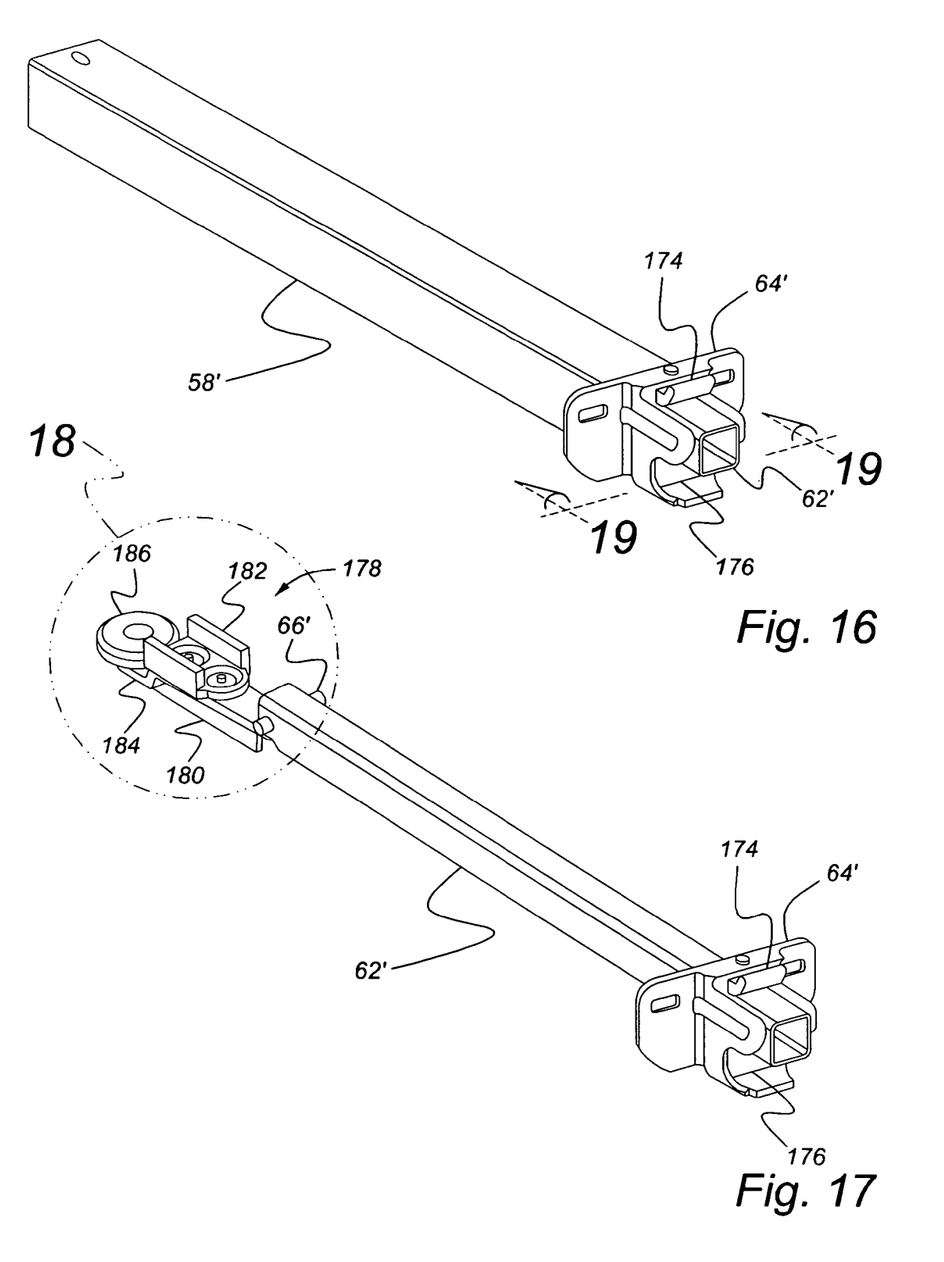
FIG. 16 is a perspective view of a guide rail, support tube, and latch assembly in accordance with the second embodiment of the present invention.
FIG. 17 is a view similar to FIG. 16, but without the guide tube shown.
Figure 18:
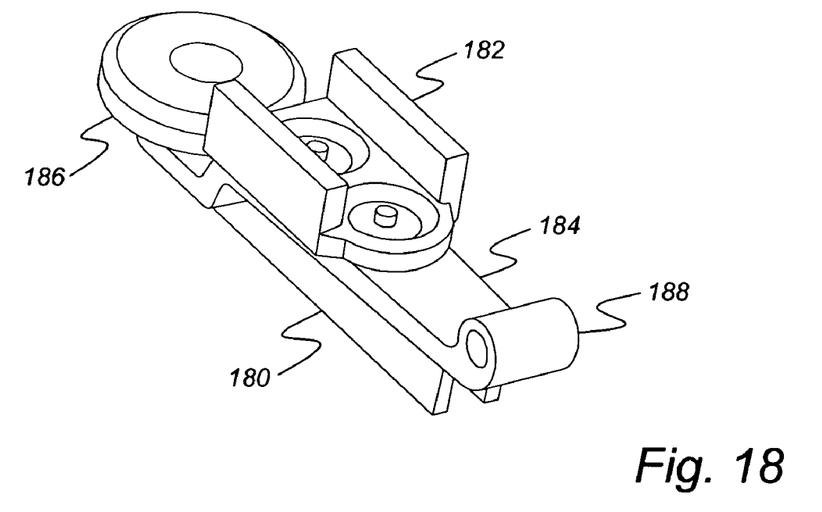
FIG. 18 is a perspective view, on an enlarged scale, of a roller assembly, taken from encircled area 18 in FIG. 17

The movable frame portion 56' now includes a pair of roller assemblies 178, one each pivotally connected to a respective one of the support tubes 62'. Each roller assembly 178 includes a linear guide 184 having a pin boss 188 extending from a first end. Each pin boss 188 includes a bore that receives a respective one of the hinge pins 66'. This arrangement translationally couples the roller assemblies 178 to their respective support tubes 62' while still allowing the support tubes 62' to pivot relative to the roller assemblies 178.

Figure 19:
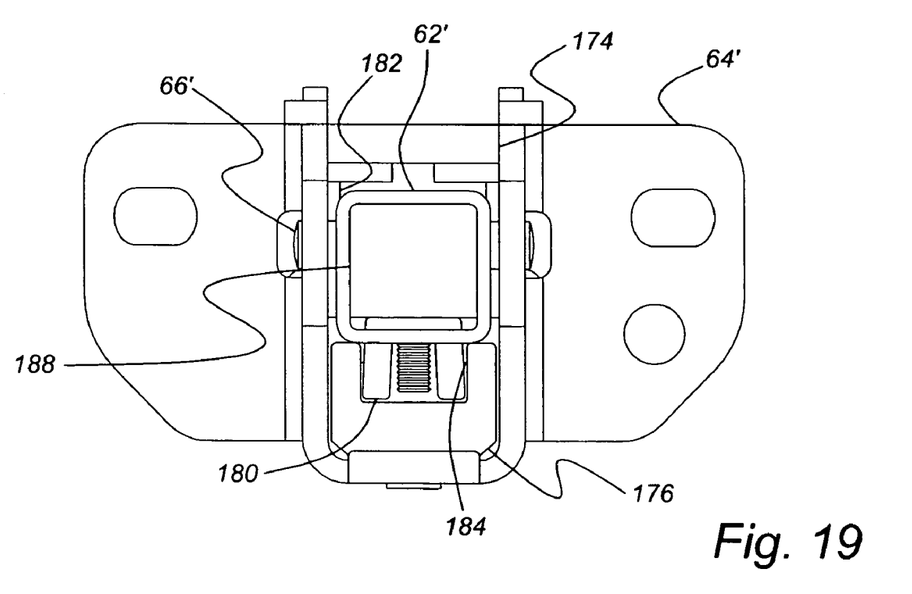
FIG. 19 is an end view, on an enlarged scale, of the guide rail, support tube, and latch assembly as taken along line 19—19 in FIG. 16.

The roller support assemblies 178 also include a pair of upper roller guides 182 mounted to the linear guides 184, and a pair of lower roller guides 180 also mounted to the linear guides 184. Preferably, the lower roller guides 180 include some type of fastener mechanism, such as rivet pins, that extend through the linear guide 184 and upper roller guide 182 and hold the three components together. The upper and lower roller guides 182 and 180 help maintain the proper orientation of each support tube 62' within its respective guide rail 58. Each roller support assembly 178 also includes a roller 186 that is mounted to its respective linear guide 184 with some type of fastener mechanism, such as a rivet pin, which allows each roller 186 to rotate relative to its linear guide 184. These rollers 186 will also help maintain the proper orientation of the support tubes 62' relative to the guide rails 58'.

Also, mounted to each pivot bracket 64' is a first guide block 174 and a second guide block 176. These guide blocks 174 and 176 help to support and to maintain the support tubes 62' in the proper orientation as they are slid into and out of the guide rails 58'. Moreover, the second guide blocks 176 are generally U-shaped and receive respective lower roller guides 180 within the U-shape when support tubes 62' are almost fully extended. This arrangement further reduces the chances for binding of the support tubes 62' in the guide rails 58'.

The roller assembly 178 disclosed in this second embodiment provides for improved travel smoothness over the first embodiment. That is, as the support tubes 62' are being slid into and out of the guide rails 58', the operator will generally feel a smoother telescoping motion. Moreover, the guide assembly 178, along with the first and second guide blocks 174 and 176, reduces the risk that the movable frame portion 56' will bind relative to the guide rails 58'. Otherwise, the second embodiment operates the same as the first embodiment, and so will not be discussed further.

While certain example embodiments of the present invention have been described in detail, those familiar with the art to which this invention relates will recognize various alternative designs and embodiments for practicing the invention as defined by the following claims.

What is claimed is:

1. A tailgate assembly for use with a motor vehicle having a pair of spaced, generally vertical side walls and a generally horizontal bed extending therebetween, the tailgate assembly comprising:
   a tailgate frame defining a generally hollow cavity and adapted to pivotally mount generally between the side walls and being operable in a generally horizontal open position and a generally vertical closed position; and
   a supplemental tailgate including a first and a second guide tube secured generally within the hollow cavity, and with the first guide tube including a latch device; and a movable frame assembly having a first and a second telescoping support, with the first telescoping support telescopically extendable from and retained by the first guide tube and the second telescoping support telescopically extendable from and retained by the second guide tube, a cross member connected to the first and second telescoping supports and extending therebetween, a release lever mounted on the cross member, and a latching assembly mounted within the first telescoping support and operatively connected to the release lever and to the latch device.

2. The tailgate assembly of claim 1 wherein the second guide tube includes a second latch device and the movable frame assembly includes a second latching assembly mounted within the second telescoping support and operatively connected to the release lever and to the second latch device.

3. The tailgate assembly of claim 2 wherein the latching assembly includes a latch housing that is slidable within the first telescoping support and is actuable by the release lever, and a latch blade that is selectively disengagable with the latch device and cooperates with the latch housing to disengage from the latch device when the latch housing is actuated by the release lever; and the second latching assembly includes a second latch housing that is slidable within the second telescoping support and is actuable by the release lever, and a second latch blade that is selectively disengagable with the second latch device and cooperates with the second latch housing to disengage from the second latch device when the second latch housing is actuated by the release lever.

4. The tailgate assembly of claim 3 wherein the movable frame assembly includes a pivot pin, mounted to the first telescoping support, a latch return spring, mounted to the pivot pin and the latch housing such that the latch housing is biased against actuation by the release lever, a second pivot pin, mounted to the second telescoping support, and a second latch return spring, mounted to the second pivot pin and the second latch housing such that the second latch housing is biased against actuation by the release lever.

5. The tailgate assembly of claim 2 wherein the release lever is a pivotable molding that includes two spaced release devices and two actuation members, and the cross member includes two spaced pivot mounts that each operatively engage a respective one of the release devices such that the pivotable molding is pivotable relative to the cross member, and the two actuation members each cooperate with a respective one of the latch housings to actuate the latch housings when the pivotable molding is pivoted relative to the cross member.

6. The tailgate assembly of claim 2 wherein the movable frame assembly further includes two pivot brackets, each having a pivot slot, with one of each of the pivot brackets mounted on a respective one of the first and second guide tubes; and two pivot pins, one each secured to a respective one of the first and second telescoping supports, whereby when the telescoping supports are essentially fully removed from the respective first and second guide tubes, the pivot pins will engage with the pivot slots to secure the first and second telescoping supports to the respective first and second guide tubes while allowing the first and second telescoping supports to pivot relative to the first and second guide tubes.

7. The tailgate assembly of claim 1 wherein the latching assembly includes a latch housing that is slidable within the first telescoping support and is actuable by the release lever, and a latch blade that is selectively disengagable with the latch device and cooperates with the latch housing to disengage from the latch device when the latch housing is actuated by the release lever.

8. The tailgate assembly of claim 7 wherein the latching assembly includes a latch blade spring that cooperates with the latch blade to bias the latch blade into engagement with the latch device.

9. The tailgate assembly of claim 7 wherein the latch device is at least one detent in said first guide tube, and the latch blade includes a retention tab that is selectively engagable with the at least one detent.

10. The tailgate assembly of claim 1 wherein the movable frame assembly includes a pivot pin, mounted to the first telescoping support, and a latch return spring, mounted to the pivot pin and the latch housing such that the latch housing is biased against actuation by the release lever.

11. The tailgate assembly of claim 1 wherein the release lever is a pivotable molding that includes a release device and an actuation member, and the cross member includes a pivot mount that operatively engages the release device such that the pivotable molding is pivotable relative to the cross member, and the actuation member cooperates with the latch housing to actuate the latch housing when the pivotable molding is pivoted relative to the cross member.

12. The tailgate assembly of claim 1 wherein the movable frame assembly further includes a first and a second pivot bracket, with the first pivot bracket mounted on the first guide tube and the second pivot bracket mounted on the second guide tube; and a first pair of guide blocks mounted to the first pivot bracket and in surface contact with the first telescoping support to thereby position the first telescoping support relative to the first guide tube, and a second pair of guide blocks mounted to the second pivot bracket and in surface contact with the second telescoping support to thereby position the second telescoping support relative to the second guide tube.

13. The tailgate assembly of claim 1 wherein the movable frame assembly further includes a first and a second linear guide, with the first linear guide mounted to the first telescoping support within and in surface contact with the first guide tube to thereby position the first telescoping support relative to the first guide tube, and with the second linear guide mounted to the second telescoping support within and in surface contact with the second guide tube to thereby position the second telescoping support relative to the second guide tube.

14. The tailgate assembly of claim 1 wherein the movable frame assembly further includes a first and a second roller guide, with the first roller guide mounted to the first telescoping support within and in surface contact with the first guide tube to thereby position the first telescoping support relative to the first guide tube, and with the second roller guide mounted to the second telescoping support within and in surface contact with the second guide tube to thereby position the second telescoping support relative to the second guide tube.

15. The tailgate assembly of claim 14 wherein the first roller guide includes a lower roller guide in sliding surface contact with the first guide tube, an upper roller guide mounted on the lower roller guide and in surface contact with the first guide tube, and a roller rotatably mounted to the lower roller guide and in rolling surface contact with the first guide tube.

16. A tailgate assembly for use with a motor vehicle having a pair of spaced, generally vertical side walls and a generally horizontal bed extending therebetween, the tailgate assembly comprising:
- a tailgate frame defining a generally hollow cavity therein adapted to pivotally mount transversely generally between said side walls and being movable into a generally horizontal open position;
- a supplemental tailgate extendable from said tailgate frame and including a movable frame assembly supported from said tailgate frame, said movable frame assembly having a cross member oriented generally transversely; and
- a latch mechanism operably associated with said movable frame assembly to restrain extension movement of said movable frame assembly relative to said tailgate frame, said latch mechanism being operated through an actuation lever supported on said movable frame.

17. The tailgate assembly of claim 16 wherein said movable frame assembly is mounted for pivotal movement relative to said tailgate frame.

18. The tailgate assembly of claim 17 wherein said movable frame assembly includes a pivotable molding located along a peripheral edge of said movable frame assembly, said actuation lever being formed into said pivotable molding.

19. The tailgate assembly of claim 18 wherein said supplemental tailgate further includes a guide apparatus supporting said movable frame assembly for affecting said extension movement thereof from said tailgate assembly, said guide apparatus being mounted in said tailgate frame with said movable frame assembly being telescopic therefrom.

20. The tailgate assembly of claim 19 wherein said guide apparatus includes a pair of transversely spaced guide tubes, said movable frame assembly including a pair of supports telescopically received within corresponding said guide tubes, said cross member extending transversely between said supports.

21. The tailgate assembly of claim 19 wherein said guide apparatus includes a pivot bracket positioned to receive a pivot pin mounted on said movable frame assembly when said movable frame assembly has been extended to a pivot position, said pivot bracket enabling said movable frame assembly to pivot downwardly relative to said tailgate frame such that said cross member is located below said tailgate frame to serve as a step for accessing said bed, and to pivot upwardly relative to said tailgate frame such that said cross member is located above said tailgate frame.

22. The tailgate assembly of claim 21 further comprising lock members extending between said cross member and said side walls to restrain said movable frame assembly in said upwardly pivoted position with said cross member located above said tailgate frame.

23. In a pick-up truck having a pair of spaced, generally vertical side walls; a generally horizontal bed extending between said side walls; a tailgate assembly pivotally mounted for movement relative to said bed between an upright closed position and a generally horizontal open position, said tailgate assembly including a tailgate frame and a tailgate latch apparatus cooperable with said side walls to releasably attach said tailgate assembly to said side walls into a closed position, the improvement comprising:
- a movable frame assembly supported from said tailgate frame for extendable movement relative to said tailgate frame between a retracted position and an outwardly extended position, said movable frame assembly having a cross member oriented generally transversely and being generally aligned with a peripheral edge of said tailgate frame when in said retracted position and spaced outwardly away from said peripheral edge when in said extended position; and
- a latch mechanism operatively associated with said movable frame assembly to control the extendable movement of said movable frame assembly relative to said tailgate frame, said latch mechanism being operable to locate said movable frame assembly in at least two extended positions, including a locked extended position and a pivotable extended position, said cross member being pivotably movable relative to said tailgate frame when said movable frame is in said pivotable extended positio said latch mechanism being independently operable from said tailgate latch apparatus.

24. The pick-up truck of claim 23 wherein said tailgate frame supports a pivot bracket positioned to receive a pivot pin mounted on said movable frame assembly when said movable frame assembly has been located in said pivotable extended position, said pivot bracket enabling said movable frame assembly to pivot downwardly relative to said tailgate frame such that said cross member is located below said tailgate frame to serve as a step for accessing said bed, and to pivot upwardly relative to said tailgate frame such that said cross member is located above said tailgate frame.

25. The pick-up truck of claim 24 further comprising:
- a guide apparatus supporting said movable frame assembly for telescopic movement therefrom to affect said extendable movement thereof, said guide apparatus being mounted in said tailgate frame.

26. The pick-up truck of claim 24 wherein said movable frame assembly includes a pivotable molding mounted on said cross member cooperable with said latch mechanism to affect actuation thereof.

* * * * *